US011383637B2

(12) United States Patent
Ahn et al.

(10) Patent No.: US 11,383,637 B2
(45) Date of Patent: *Jul. 12, 2022

(54) WARNING MESSAGE DELIVERY APPARATUS OF VEHICLE

(71) Applicants: Hyundai Motor Company, Seoul (KR); Kia Motors Corporation, Seoul (KR)

(72) Inventors: Byoung Suk Ahn, Gwacheon-Si (KR); Seung Sik Han, Hwaseong-Si (KR); Sung Ho Park, Seoul (KR); Dae Seon Lee, Ulsan (KR); Ki Hong Lee, Seoul (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,609

(22) Filed: Feb. 19, 2021

(65) Prior Publication Data

US 2022/0063491 A1    Mar. 3, 2022

(30) Foreign Application Priority Data

Sep. 3, 2020   (KR) ..................... 10-2020-0112263

(51) Int. Cl.
*B60Q 1/52* (2006.01)
*B60Q 1/50* (2006.01)
*G09F 13/16* (2006.01)
*B60Q 7/02* (2006.01)

(52) U.S. Cl.
CPC .............. *B60Q 1/525* (2013.01); *B60Q 7/02* (2013.01); *G09F 13/16* (2013.01)

(58) Field of Classification Search
CPC ............ B60Q 1/525; B60Q 7/02; G09F 13/16
USPC ............................................. 340/471
See application file for complete search history.

(56) References Cited

U.S. PATENT DOCUMENTS

| 3,949,503 | A | * | 4/1976 | Waress | B60Q 7/005 40/591 |
| 4,054,789 | A | * | 10/1977 | Romanelli | B60Q 1/52 362/542 |
| 4,192,090 | A | * | 3/1980 | Seth | B60Q 7/00 340/472 |
| 2005/0072350 | A1 | * | 4/2005 | Aasgaard | B60Q 1/52 116/259 |
| 2014/0300462 | A1 | * | 10/2014 | Russ | B60Q 1/46 340/471 |

FOREIGN PATENT DOCUMENTS

| DE | 102015115242 A1 | 3/2017 |
| JP | 6436323 B2 | 12/2018 |
| WO | WO 2018/162221 A1 | 9/2018 |

* cited by examiner

*Primary Examiner* — Kerri L McNally
(74) *Attorney, Agent, or Firm* — Morgan, Lewis & Bockius LLP

(57) ABSTRACT

A warning message delivery apparatus of a vehicle, may deploy an emergency tripod by opening a trunk lid to deliver a warning message to a vehicle entering the rear upon the occurrence of an emergency situation, and secures visibility of the emergency tripod to reduce the accident occurrence possibility.

17 Claims, 12 Drawing Sheets

Roll

WARNING MESSAGE DELIVERY APPARATUS OF VEHICLE

CROSS REFERENCE TO RELATED APPLICATION

The present application claims priority to Korean Patent Application No. 10-2020-0112263 filed on Sep. 3, 2020, the entire contents of which is incorporated herein for all purposes by this reference.

BACKGROUND OF THE PRESENT INVENTION

Field of the Invention

The present invention relates to a warning message delivery apparatus of a vehicle having a tripod for delivering a safety warning message in an emergency situation provided simply and safely therein.

Description of Related Art

Various tools in a vehicle are required to flexibly cope with various situations. An emergency tripod for making a driver in the rear vehicle recognize the situation upon failure or accident of a vehicle on the road is essentially required for the vehicle.

However, in the case of the emergency tripod, to warn the driver in the traveling rear vehicle, there is a hassle of having to move to the rear of the vehicle by about 150 to 200 m with the emergency tripod for installation. Therefore, there may occur a risk of the secondary accident in a process of installing the emergency tripod.

Furthermore, since a conventional emergency tripod warns the driver in the rear vehicle depending on the function of reflecting the light of the traveling rear vehicle, there is also the possibility of incurring the rear end portion collision accident by the incomplete warning, and there is a problem in that the effectiveness of the reflector of the emergency tripod significantly deteriorates in rainy weather or at night.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a warning message delivery apparatus of a vehicle, which deploys an emergency tripod by opening a trunk lid upon occurrence of an emergency situation to deliver a warning message to a vehicle entering the rear, and secures the visibility of the emergency tripod to reduce the accident occurrence possibility.

A warning message delivery apparatus of a vehicle according to various exemplary embodiments of the present invention for achieving the object includes: a mounting portion configured to be fixed to an internal surface of a trunk lid; a guide portion rotatably provided on the mounting portion, and rotated by its own weight and deployed to the rear of a vehicle in a state where the trunk lid is opened; and an end portion provided on the guide portion and moved to the rear of the vehicle with the guide portion when the guide portion is deployed, and converted into a shape of delivering a warning message while being deployed downward with the deployment of the guide portion.

The guide portion is configured to be deployed with an inclination downwardly in the state where the trunk lid is opened.

The guide portion includes: a first guide bracket and a second guide bracket having one end portions provided on the mounting portion to be laterally rotated, and the other end portions connected to the end portion, and the first guide bracket and the second guide bracket are rotated in directions opposite to each other and deployed while being deployed toward the trunk lid or retracted to the rear of the vehicle.

A gear is formed on each of one end portions of the first guide bracket and the second guide bracket, and the one end portions of the first guide bracket and the second guide bracket are gear-connected through the engagement of each circular gear.

The end portion includes: a joint portion including a first joint bracket connected to the other end portion of the first guide bracket to be vertically rotatable, and a second joint bracket connected to the other end portion of the second guide bracket to be vertically rotatable; a rotation portion including a first rotating bracket connected to the first joint bracket to be laterally rotated, and a second rotating bracket connected to the second joint bracket to be laterally rotated; and a plurality of link brackets rotatably connected to the first rotating bracket and the second rotating bracket and converted into the shape of delivering the warning message when the guide portion is completely deployed.

The link bracket includes a first connecting link having one end portion connected to the first rotating bracket to be laterally rotatable, a second connecting link having one end portion connected to the second rotating bracket to be laterally rotatable, and a third connecting link connected to the other end portion of the first connecting link and the other end portion of the second connecting link to be laterally rotatable.

The third connecting link has one end portion connected to the second connecting link and the other end portion connected to the first connecting link in a state where the first connecting link and the second connecting link are crossed such that the first connecting link, the second connecting link, and the third connecting link form a triangular shape when the guide portion is deployed.

Each of a matching surface of the first joint bracket and the first rotating bracket and a matching surface of the second joint bracket and the second rotating bracket is consistent with an extending direction of the guide portion.

The link bracket includes: a bracket housing formed to communicate to the rear of the vehicle and extending in the longitudinal direction thereof; a light source portion provided inside the bracket housing to radiate light to the rear of the vehicle; and a lens portion mounted on the communicating end portion of the bracket housing and configured such that the light radiated by the light source portion is emitted to an outside of the bracket housing.

The light source portion is disposed to be spaced in the longitudinal direction of the bracket housing.

The lens portion includes a transparent lens mounted to face the light source portion and configured such that the light source portion emits the light, and a reflector having an external surface having a red-series color and having an internal surface formed to absorb or reflect the light of the light source portion to prevent the light from being emitted to an outside of the bracket housing.

The mounting portion includes: a fixing bracket configured to be fixed to the trunk lid and having an extending installation portion; and a movable bracket having one end portion formed to surround the installation portion and provided on the fixing bracket to be rotated and tilted laterally, and the other end portion formed to accommodate the guide portion and provided such that the guide portion is laterally rotatable.

The fixing bracket is formed with a plurality of locking slits radially extending around the rotating center point of the movable bracket, and the movable bracket is formed with a plurality of locking projections matched with the locking slits as the locking slits radially extend around the rotating center point thereof.

The warning message delivery apparatus of the vehicle formed of the aforementioned structure deploys the emergency tripod by opening the trunk lid upon occurrence of the emergency situation to deliver the warning message to the vehicle entering the rear, and secures the visibility of the emergency tripod to reduce the accident occurrence possibility.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
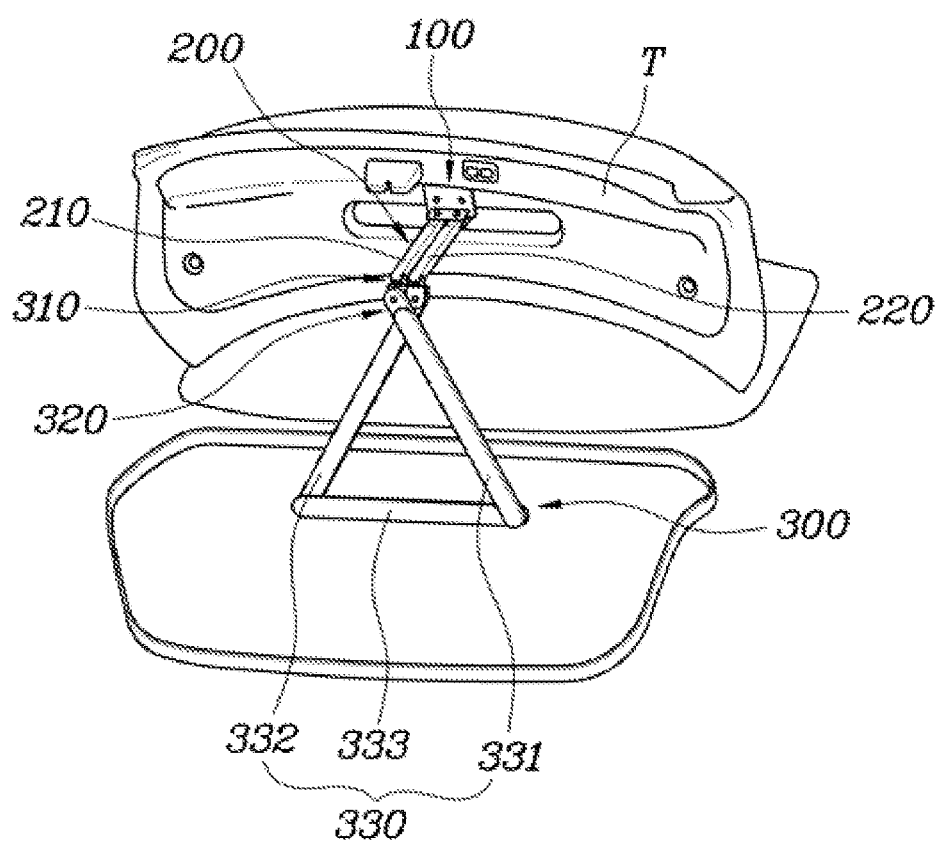
FIG. 1 is a diagram illustrating a warning message delivery apparatus of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a warning message delivery apparatus of a vehicle according to exemplary embodiments of the present invention will be described with reference to the accompanying drawings.

Figure 2:
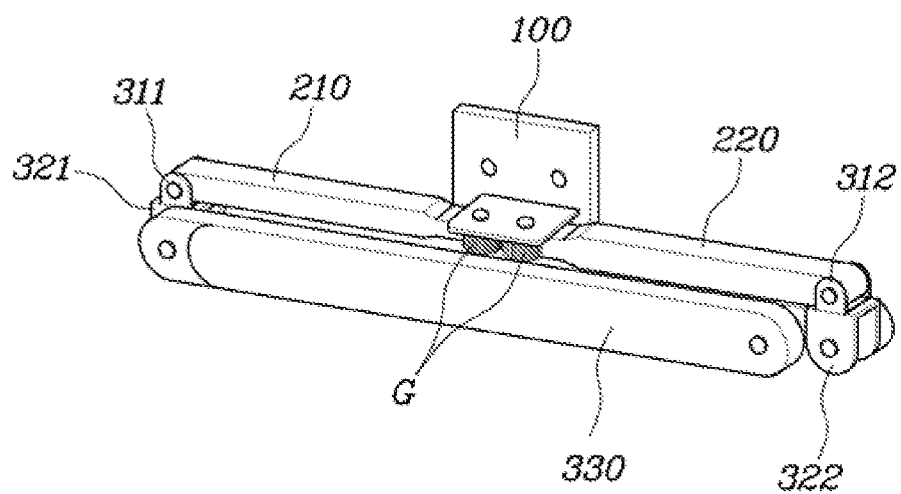
FIG. 2, FIG. 3 and FIG. 4 are diagrams for explaining a deployment operation of the warning message delivery apparatus of the vehicle illustrated in FIG. 1.
Figure 3:
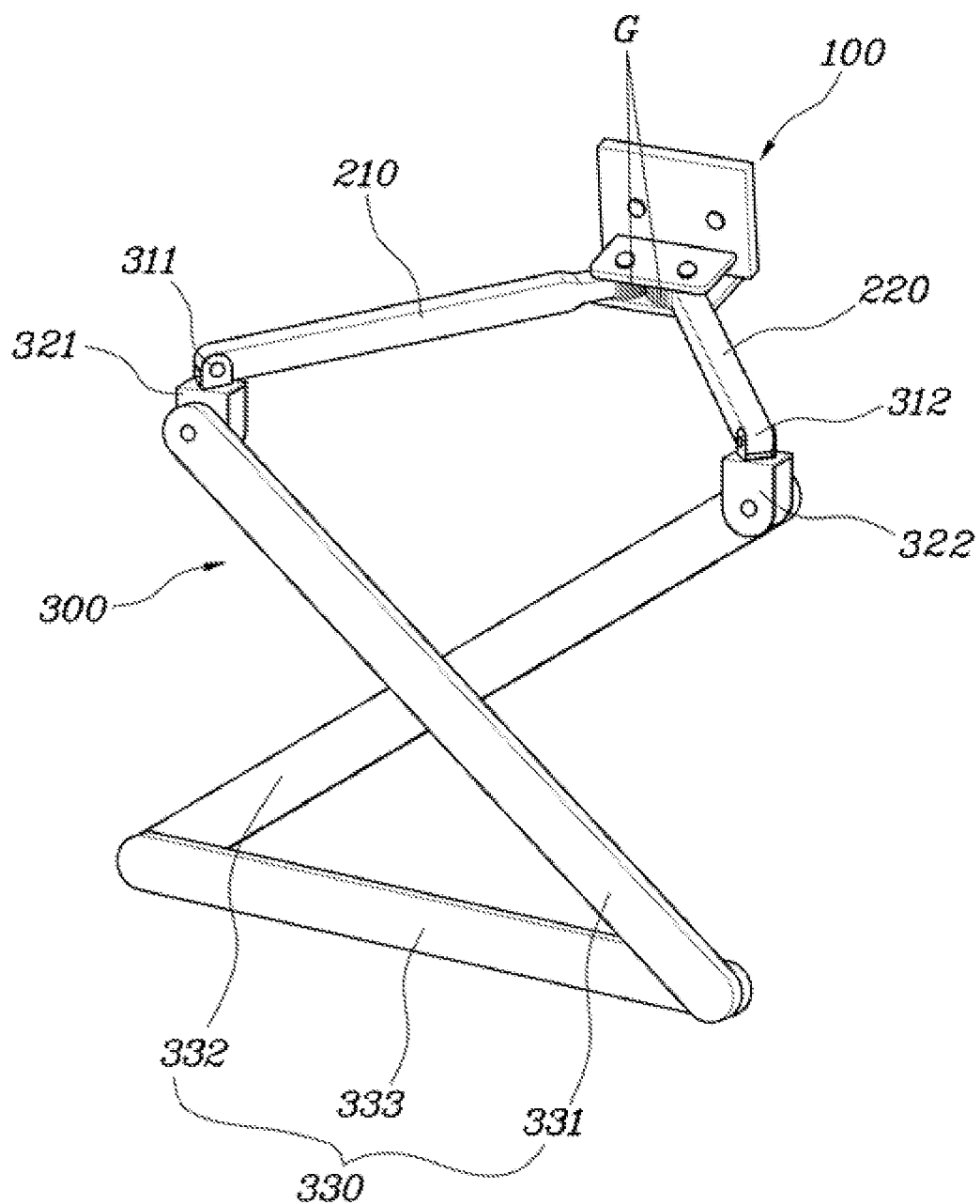
Figure 4:
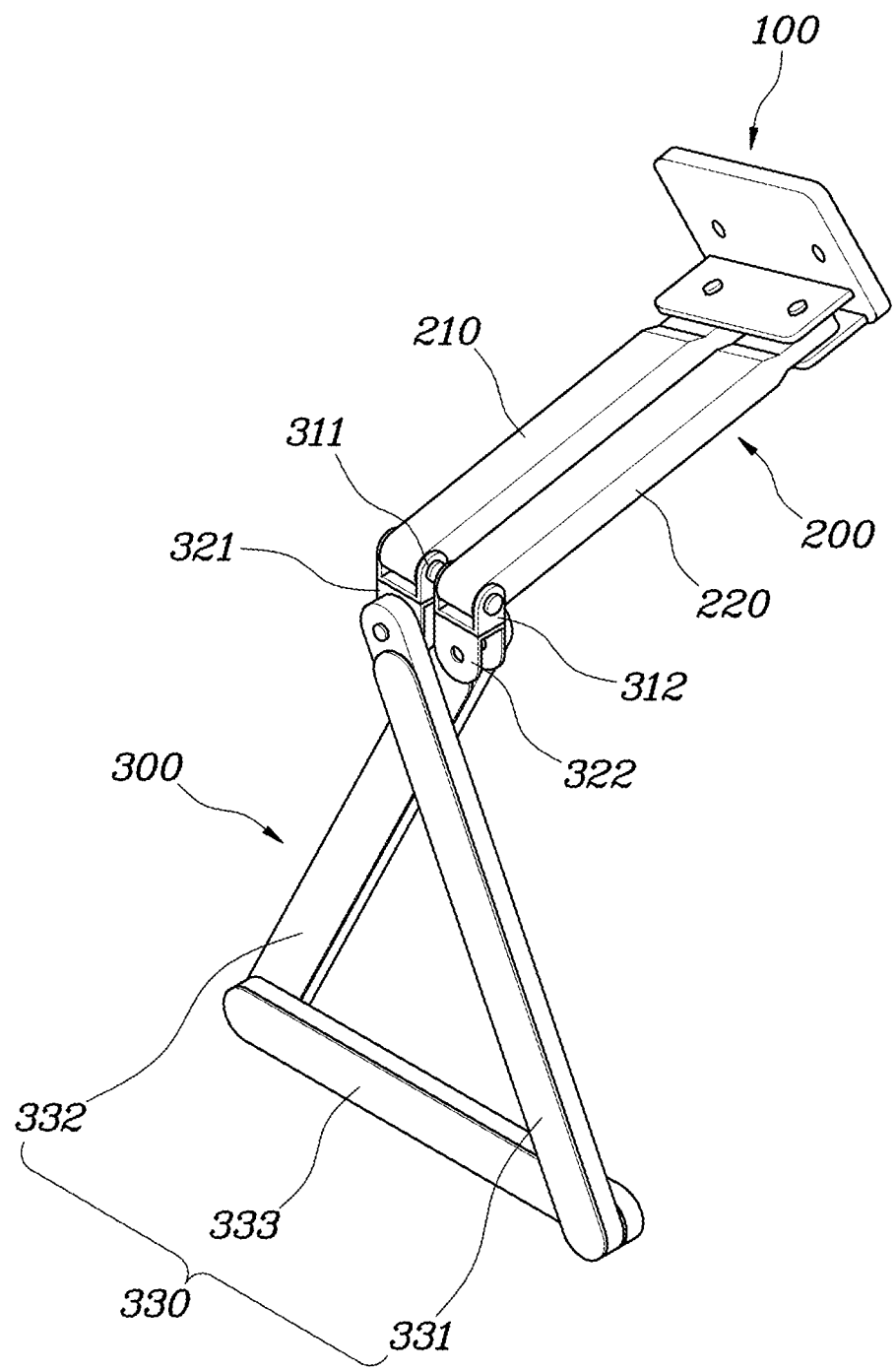
Figure 5:
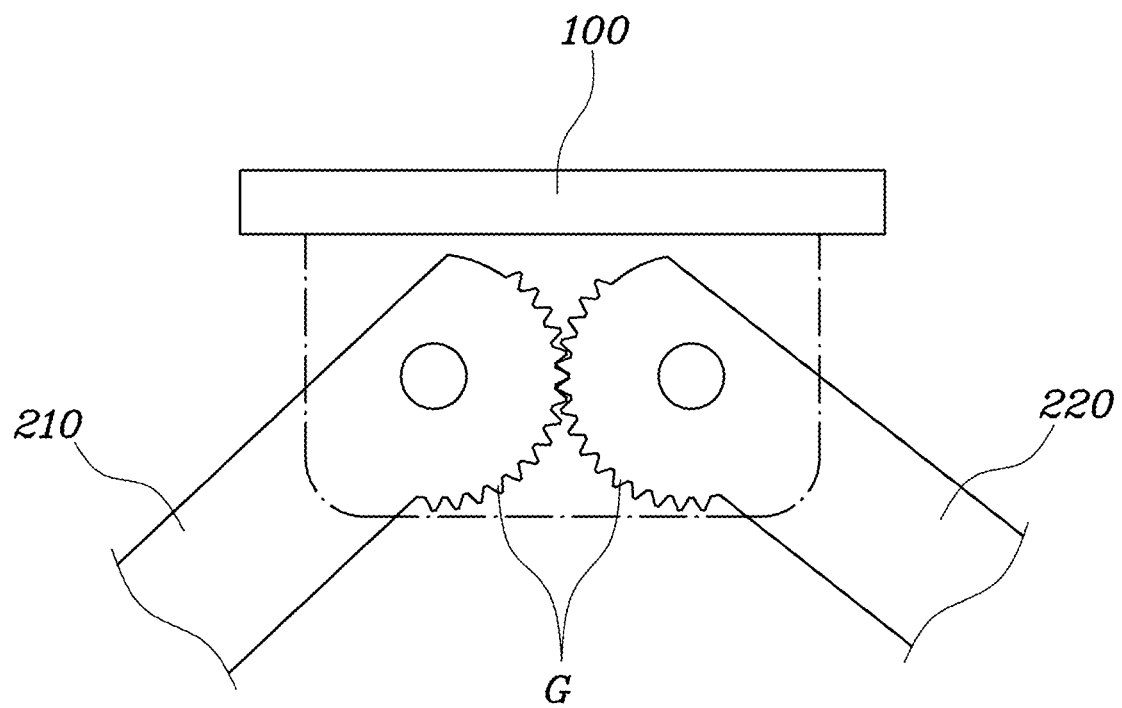
FIG. 5 is a diagram for explaining a guide portion of the warning message delivery apparatus of the vehicle illustrated in FIG. 1.
Figure 6:
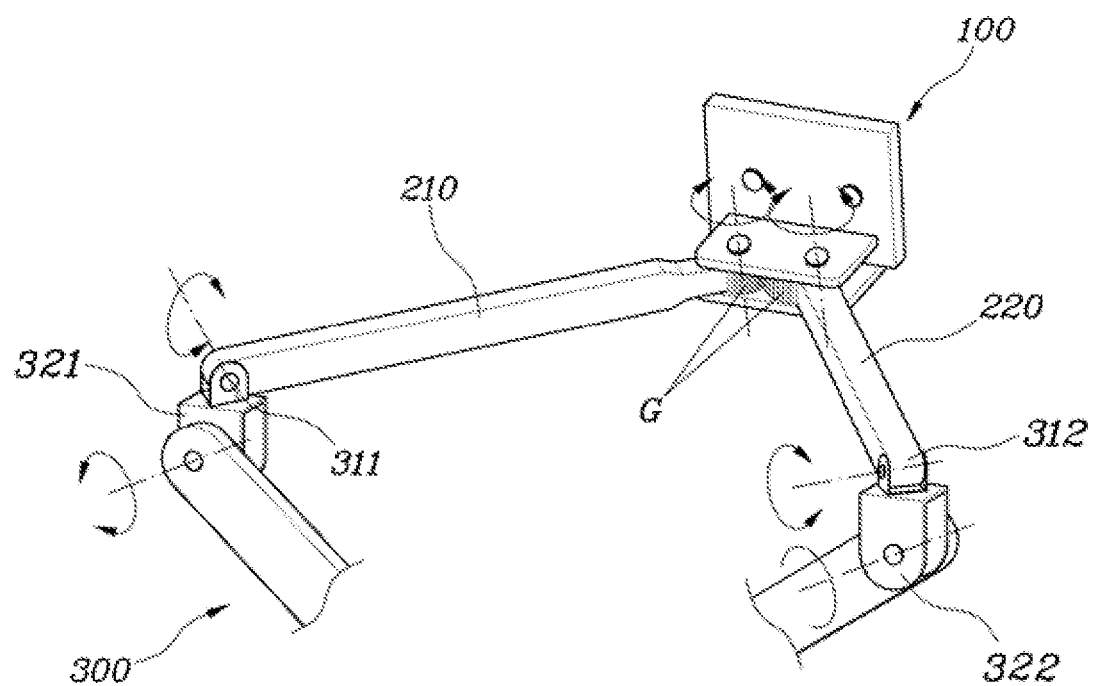
FIG. 6 and FIG. 7 are diagrams for explaining the warning message delivery apparatus of the vehicle illustrated in FIG. 1.
Figure 7:
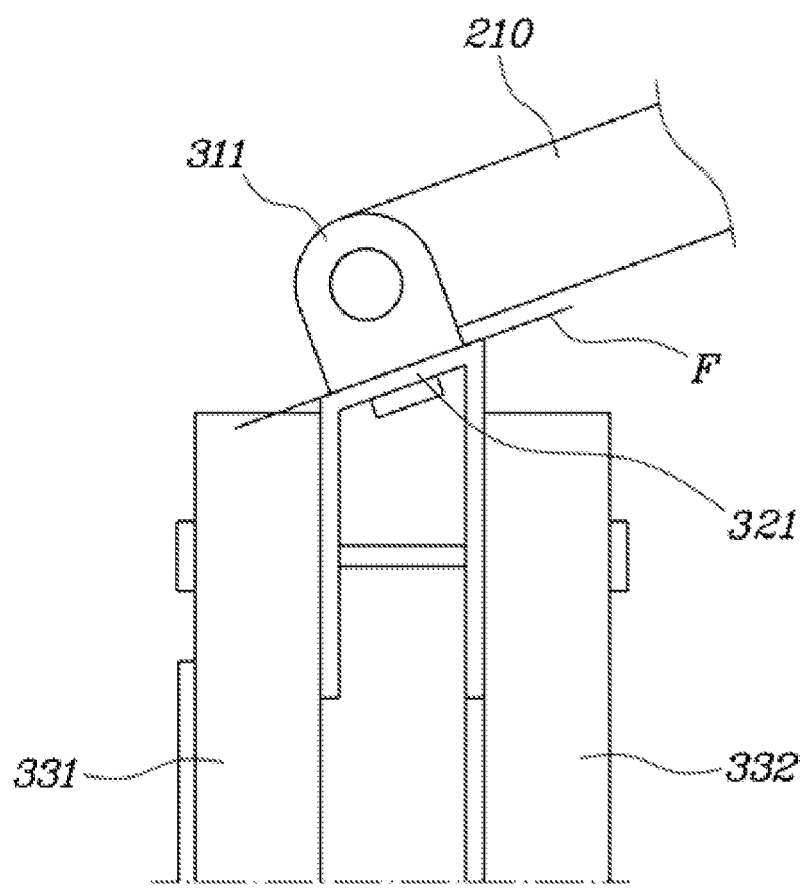
Figure 8:
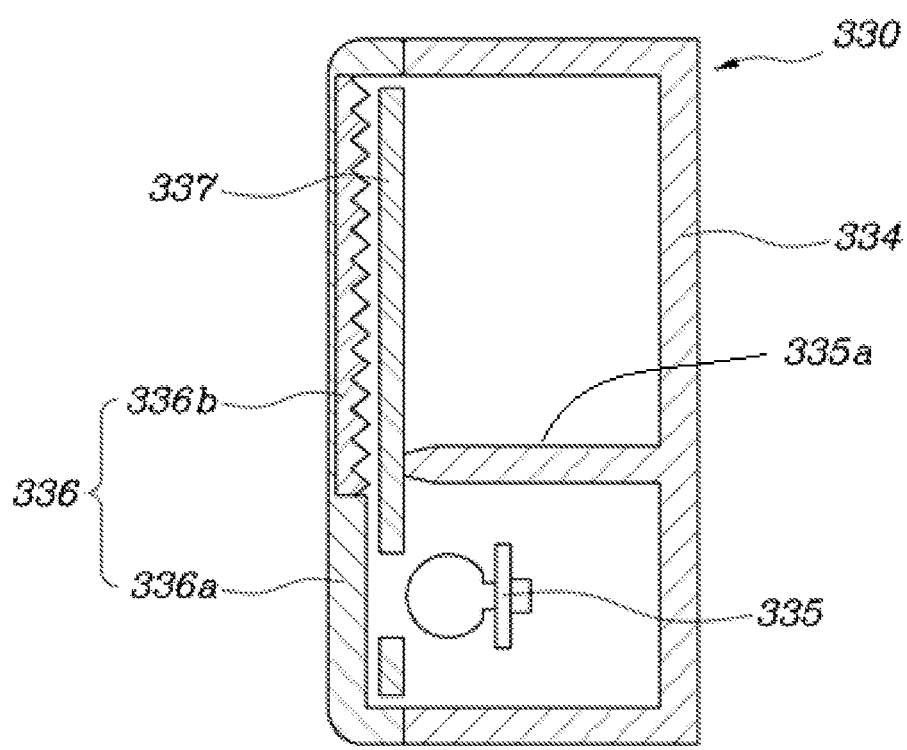
FIG. 8 is a diagram illustrating a light generating structure of an end portion according to an exemplary embodiment of the present invention.
Figure 9:
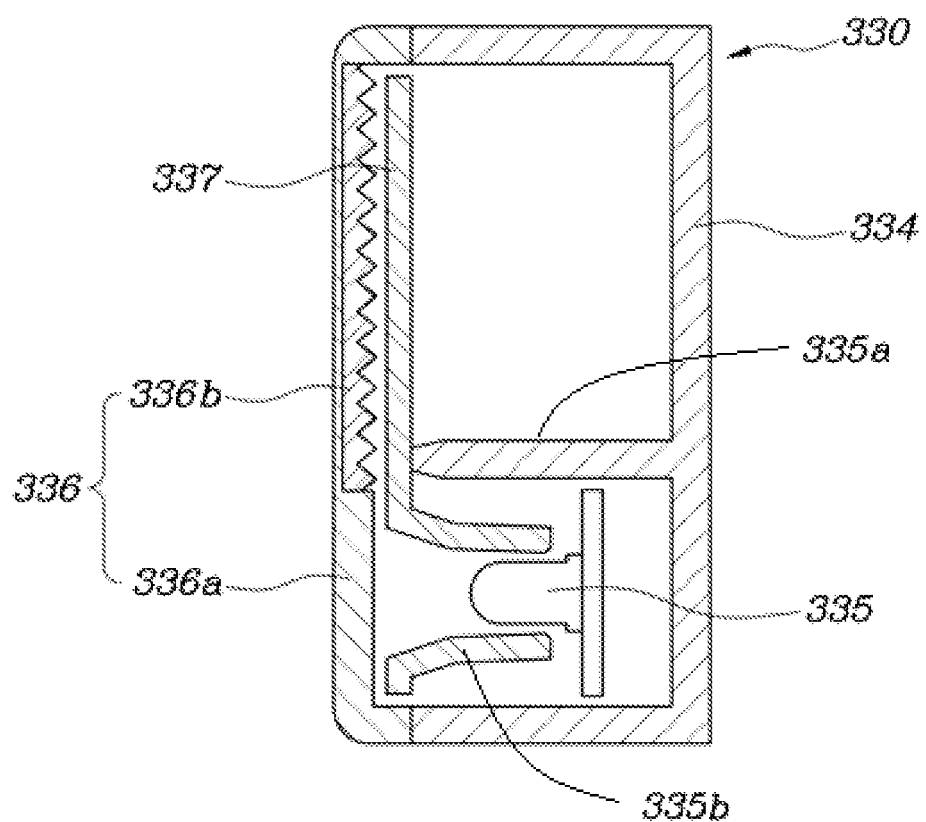
FIG. 9 is a diagram illustrating a light generating structure of the end portion according to another exemplary embodiment of the present invention.
Figure 10:
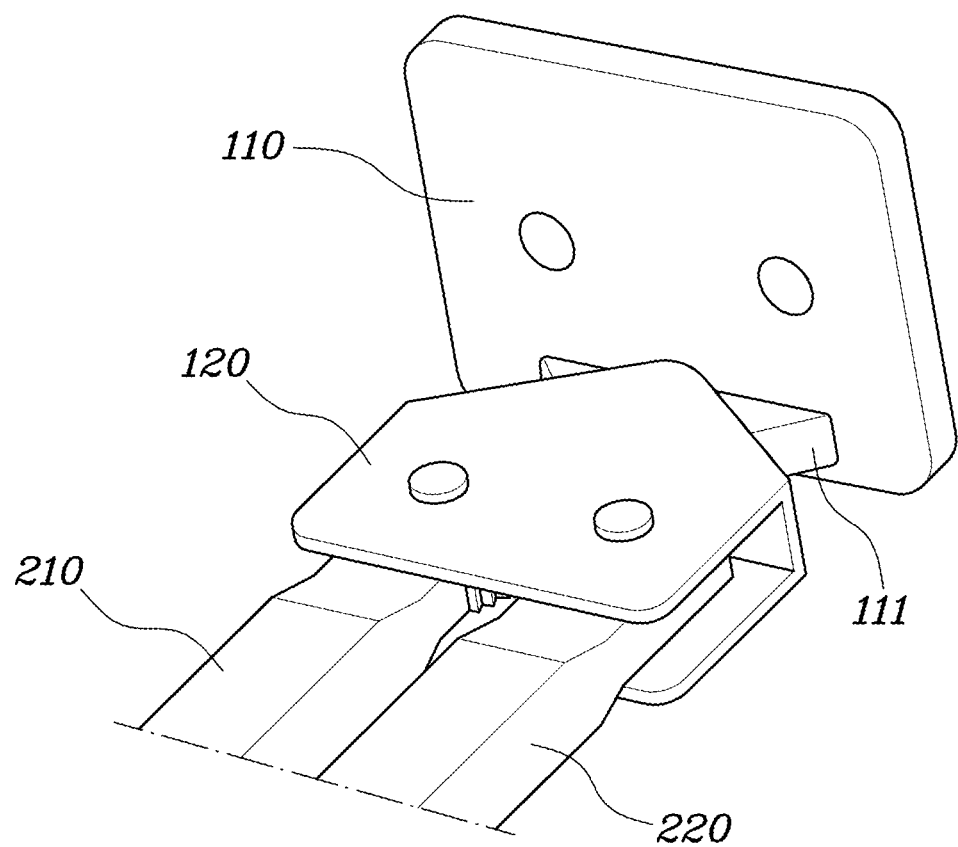
FIG. 10, and FIG. 11 are diagrams for explaining a mounting portion of the warning message delivery apparatus of the vehicle illustrated in FIG. 1.
Figure 11:
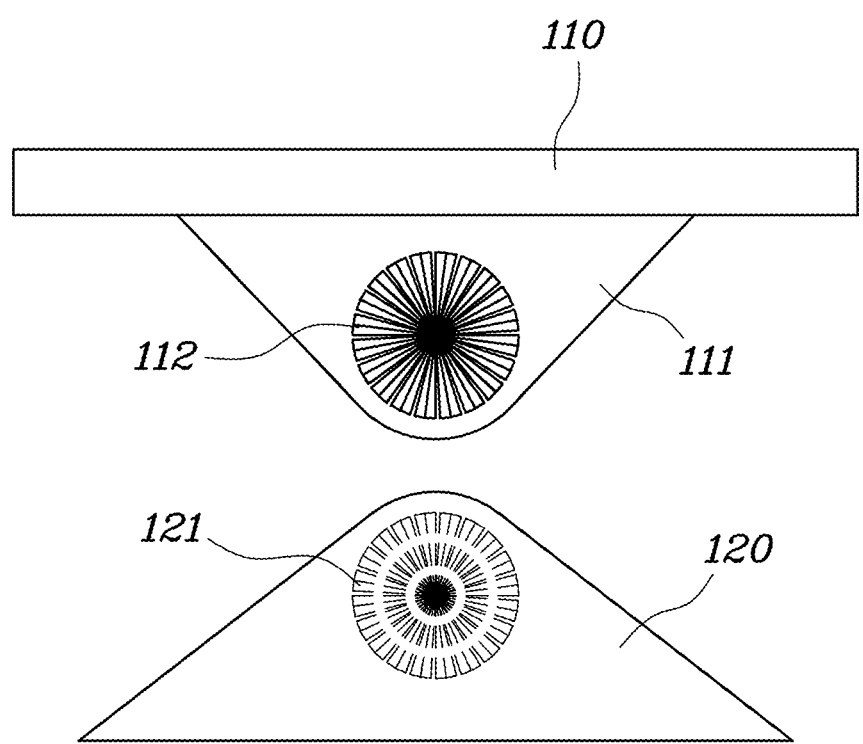
Figure 12:
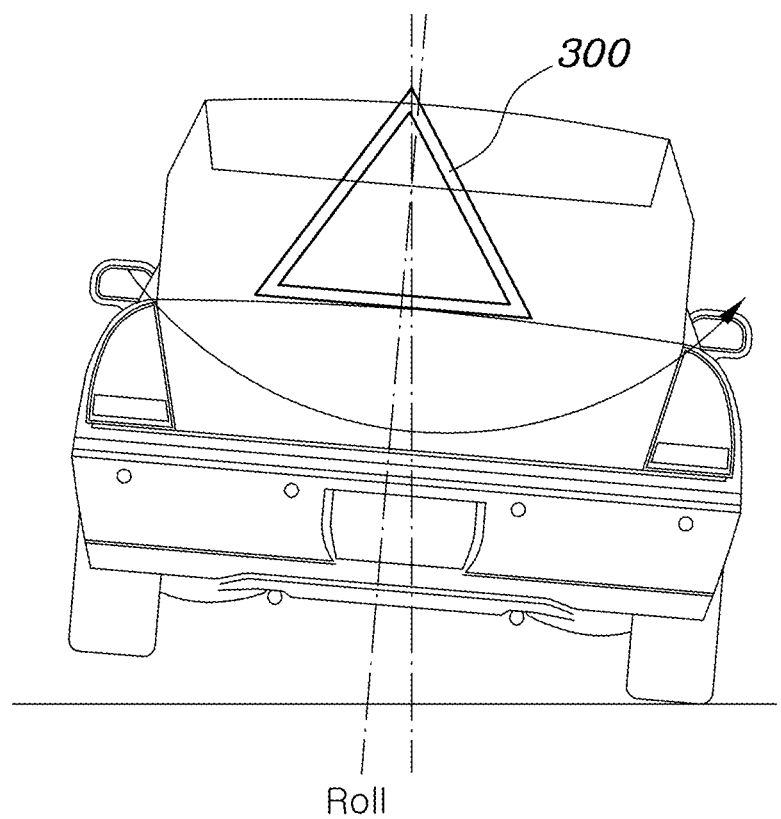
FIG. 12, and FIG. 13 are diagrams for explaining a deployment location adjustment of the end portion in an emergency situation.
Figure 13:
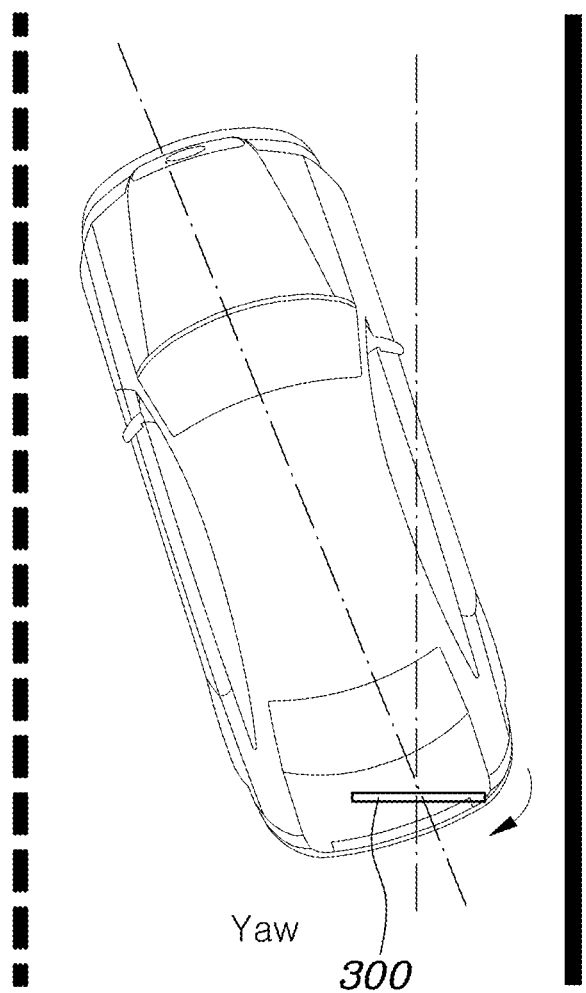

FIG. 1 is a diagram illustrating a warning message delivery apparatus of a vehicle according to various exemplary embodiments of the present invention, FIG. 2, FIG. 3 and FIG. 4 are diagrams for explaining a deployment operation of the warning message delivery apparatus of the vehicle illustrated in FIG. 1, FIG. 5 is a diagram for explaining a guide portion of the warning message delivery apparatus of the vehicle illustrated in FIG. 1, FIG. 6 and FIG. 7 are diagrams for explaining the warning message delivery apparatus of the vehicle illustrated in FIG. 1, FIG. 8 is a diagram illustrating a light generating structure of an end portion according to various exemplary embodiments of the present invention, FIG. 9 is a diagram illustrating a light generating structure of the end portion according to another exemplary embodiment of the present invention, FIG. 10, and FIG. 11 are diagrams for explaining a mounting portion of the warning message delivery apparatus of the vehicle illustrated in FIG. 1, and FIG. 12, and FIG. 13 are diagrams for explaining a deployment location adjustment of the end portion in an emergency situation.

As illustrated in FIG. 1, FIG. 2, FIG. 3, and FIG. 4, a warning message delivery apparatus of a vehicle according to various exemplary embodiments of the present invention includes a mounting portion 100 fixed to the internal surface of a trunk lid T; a guide portion 200 provided on the mounting portion 100 to be rotatable, and rotated by its own weight in a state where the trunk lid T is opened and deployed to the rear of the vehicle; and an end portion 300 provided on the guide portion 200 and moved to the rear of the vehicle together upon deployment of the guide portion 200, and deployed downward when the guide portion 200 is deployed and converted into a shape of delivering a warning message.

As described above, the present invention includes the mounting portion 100, the guide portion 200, and the end portion 300, in which the guide portion 200 and the end portion 300 are deployed to the rear of the vehicle together from the mounting portion 100 fixed to the trunk lid T, and the end portion 300 is converted into the shape of delivering the warning message.

That is, the mounting portion 100 may be fixed to the internal surface of the trunk lid T, and the guide portion 200 may be rotated in the lateral direction of the vehicle from the mounting portion 100 to be stored in the trunk lid T side or deployed to the rear of the vehicle. Here, the guide portion 200 is rotated by its own weight when the trunk lid T is opened and deployed to the rear of the vehicle such that the user may easily deploy the guide portion 200. The location of the guide portion 200 may be fixed through a constraint means such as a strap, and the constraint of the strap is released depending on whether it is used such that the guide portion 200 and the end portion 300 may be deployed by their own weights.

The end portion 300 is provided on the guide portion 200, the location thereof is changed by the deployment operation of the guide portion 200, and the end portion 300 is converted into the shape of delivering the warning message while being deployed downward with the deployment of the guide portion 200. The end portion 300 may be converted into a polygonal shape or a circular shape to deliver the warning message to the vehicle driver entering the rear, and coated in color to secure visibility.

As described above, according to various exemplary embodiments of the present invention, when the trunk lid T is opened, the guide portion 200 is deployed to the rear of the vehicle, and the end portion 300 moved to the rear of the vehicle by the guide portion 200 is deployed downward with the deployment operation of the guide portion 200 such that the warning message recognizable by the driver in the rear vehicle is formed through the end portion 300. The deployed operation of the end portion 300 is simultaneously performed with the deployment operation of the guide portion 200, avoiding the interference between a trunk compartment and peripheral components, and exerting the high quality effect through the smooth deployment operation.

Specifically describing the aforementioned present invention, the guide portion 200 may be configured to be deployed with an inclination downwardly in a state where the trunk lid is opened.

As illustrated in FIG. 1, as the guide portion 200 is provided to have the inclination downwardly in the state where the trunk lid T is opened, the guide portion 200 may be rotated and deployed downward by its own weight when the trunk lid T is opened. That is, the guide portion 200 may be rotated downward when the trunk lid T is opened as the weight of the end portion 300 is added together with its own weight. In the state where the trunk lid T is opened, if the guide portion 200 is to be configured to be linearly deployed toward the rear of the vehicle, the deployment may not be smoothly performed by its own weight, and if the guide portion 200 is to be configured to be vertically deployed downward, the end portion 300 interferes with the trunk and the guide portion 200 is not unfolded. Therefore, the guide portion 200 is configured to be deployed with the inclination in the state where the trunk lid T is opened.

Meanwhile, the guide portion 200 includes a first guide bracket 210 and a second guide bracket 220 having one end portions provided on the mounting portion 100 to be laterally rotated and the other end portions connected to the end portion 300, and the first guide bracket 210 and the second guide bracket 220 may be rotated in the opposite directions and the guide portion is deployed while being deployed toward the trunk lid T or retracted to the rear of the vehicle.

As illustrated in FIG. 2, FIG. 3 and FIG. 4, the guide portion 200 includes the first guide bracket 210 and the second guide bracket 220, and the first guide bracket 210 and the second guide bracket 220 are provided on the mounting portion 100 to be rotated and configured to be rotated in the opposite direction thereof. Therefore, as illustrated in FIG. 2, the first guide bracket 210 and the second guide bracket 220 are rotated and deployed toward the trunk lid T from the mounting portion 100 to become the storage state. Here, as illustrated in FIG. 3 and FIG. 4, the first guide bracket 210 and the second guide bracket 220 are rotated and retracted to the rear of the vehicle to become the deployment state, and the end portion 300 connected to the first guide bracket 210 and the second guide bracket 220 is moved to the rear side of the vehicle.

To rotate the first guide bracket 210 and the second guide bracket 220 in the opposite directions, a circular gear G is formed on each of one end portions of the first guide bracket 210 and the second guide bracket 220, and one end portions of the first guide bracket 210 and the second guide bracket 220 may be gear-connected through the engagement of each circular gear G.

As illustrated in FIG. 5, as the first guide bracket 210 and the second guide bracket 220 are gear-connected through the circular gear G formed on each of one end portions thereof, the second guide bracket 220 is rotated counterclockwise when the first guide bracket 210 is rotated clockwise, and the second guide bracket 220 is rotated clockwise when the first guide bracket 210 is rotated counterclockwise. Therefore, the first guide bracket 210 and the second guide bracket 220 may have the respective one end portions connected through the circular gear G and the other end portions rotated and moved, performing the deployed or retracted operation.

As described above, as the first guide bracket 210 and the second guide bracket 220 are rotated in the opposite directions, the first guide bracket 210 and the second guide bracket 220 are converted into the storage state or the deployment state. Furthermore, the radiuses according to the rotating operations of the first guide bracket 210 and the second guide bracket 220 are reduced, reducing the installation space.

Meanwhile, the end portion 300 may include a joint portion 310 including a first joint bracket 311 connected to the other end portion of the first guide bracket 210 to be vertically rotated, and a second joint bracket 312 connected to the other end portion of the second guide bracket 220 to be vertically rotated; a rotation portion 320 including a first rotating bracket 321 connected to the first joint bracket 311 to be laterally rotated, and a second rotating bracket 322 connected to the second joint bracket 312 to be laterally rotated; and a plurality of link brackets 330 rotatably connected to the first rotating bracket 321 and the second rotating bracket 322 and converted into a shape of delivering the warning message when the guide portion 200 is completely deployed.

As described above, the end portion 300 includes the joint portion 310, the rotation portion 320, and the link bracket 330, and converted into the shape of delivering the warning message as the link bracket 330 connected via the joint portion 310 and the rotation portion 320 is moved and deployed to the rear of the vehicle when the guide portion 200 is deployed such that the driver in the rear vehicle may confirm the warning message.

That is, the first joint bracket 311 and the second joint bracket 312 configuring the joint portion 310 are connected to the first guide bracket 210 and the second guide bracket 220 to be vertically rotated, respectively; the first rotating bracket 321 and the second rotating bracket 322 configuring the rotation portion 320 are connected to the first joint bracket 311 and the second joint bracket 312 to be laterally rotated, respectively; and the plurality of link brackets 330 connect the first joint bracket 311 and the second joint bracket 312 such that all of the joint portion 310, the rotation portion 320, and the link bracket 330 are simultaneously rotated by the rotation of the guide portion 200. Therefore, the link bracket 330 is converted into the shape of delivering the warning message as the link bracket 330 performs the operation by which the location thereof is moved and the link bracket 330 is deployed to the rear of the vehicle.

Describing the above content, as illustrated in FIGS. 4 and 6, the first joint bracket 311 and the second joint bracket 312 are hinged to the first guide bracket 210 and the second guide bracket 220 to be vertically rotated, respectively. Furthermore, the first rotating bracket 321 and the second rotating bracket 322 are hinged to the lower portions of the first joint bracket 311 and the second joint bracket 312 to be laterally rotated, respectively. Furthermore, the link bracket 330 includes a first connecting link 331 having one end portion hinged to the first rotating bracket 321 to be laterally rotatable, a second connecting link 332 having one end portion hinged to the second rotating bracket 322 to be laterally rotatable, and a third connecting link 333 hinged to the other end portion of the first connecting link 331 and the other end portion of the second connecting link 332 to be laterally rotatable.

Here, the first guide bracket 210 and the second guide bracket 220 have the respective one end portions connected to each other, and the other end portions rotated to be retracted or unfolded such that all of the first joint bracket 311, the second joint bracket 312, the first rotating bracket 321, the second rotating bracket 322, the first connecting link 331, the second connecting link 332, and the third connecting link 333 are simultaneously rotated when the first guide bracket 210 and the second guide bracket 220 are rotated.

That is, the first joint bracket 311 and the second joint bracket 312 maintain the state where the link bracket 330 is vertically deployed with respect to the first guide bracket 210 and the second guide bracket 220, and allow the first connecting link 331 and the second connecting link 332 to laterally move while the first rotating bracket 321 and the second rotating bracket 322 are rotated when the first guide bracket 210 and the second guide bracket 220 are rotated. As described above, as a distance between the first connecting link 331 and the second connecting link 332 are close, the first connecting link 331, the second connecting link 332, and the third connecting link 333 may be rotated and the connecting forms thereof may be changed, forming the shape of delivering the warning message.

As described above, according to various exemplary embodiments of the present invention, when the guide portion 200 is deployed, the link bracket 330 may maintain the vertical direction via the joint portion 310, and as the rotation portion 320 is simultaneously rotated, the link bracket 330 is converted into the shape of delivering the warning message while being moved to the rear of the vehicle. Therefore, in the state where the trunk lid T is opened, the guide portion 200 avoids the interference with other components when the end portion 300 is moved to the rear of the vehicle, and the end portion 300 is converted into the shape of delivering the warning message while being moved to the rear of the vehicle, upgrading the product and making it easier for the driver in the rear vehicle to recognize the warning message.

Here, the third connecting link 333 has one end portion connected to the second connecting link 332 and the other end portion connected to the first connecting link 331 in a state where the first connecting link 331 and the second connecting link 332 are crossed such that when the guide portion 200 is deployed, the first connecting link 331, the second connecting link 332, and the third connecting link 333 may form a triangular shape. As described above, when the guide portion 200 is completely deployed, the first connecting link 331, the second connecting link 332, and the third connecting link 333 may be deployed in the triangular shape, delivering the warning message such as the emergency tripod. Considering the implementation and storage of the triangular shape, the lengths of the first connecting link 331, the second connecting link 332, and the third connecting link 333 may be equally formed. Furthermore, the link bracket 330 may change the message to be delivered by further adding the connecting link in addition to the first connecting link 331, the second connecting link 332, and the third connecting link 333 or changing the shape of each connecting link.

Furthermore, as illustrated in FIG. 7, each of a matching surface F between the first joint bracket 311 and the first rotating bracket 321 and a matching surface F between the second joint bracket 312 and the second rotating bracket 322 is consistent with an extending direction of the guide portion 200. Therefore, the first rotating bracket 321 and the second rotating bracket 322 secure the contact rigidity against the first joint bracket 311 and the second joint bracket 312, respectively. Furthermore, each of the matching surface F between the first joint bracket 311 and the first rotating bracket 321 and the matching surface F between the second joint bracket 312 and the second rotating bracket 322 is consistent with an extending direction of the guide portion 200 such that the rotating center axes of the first rotating bracket 321 and the second rotating bracket 322 may have the directions perpendicular to the first guide bracket 210 and the second guide bracket 220, smoothly performing the rotating operations.

Meanwhile, as illustrated in FIG. 8, the link bracket 330 includes a bracket housing 334 formed to communicate to the rear of the vehicle and extending in the longitudinal direction thereof; a light source portion 335 provided inside the bracket housing 334 to radiate light to the rear of the vehicle; and a lens portion 336 mounted on the communicating end portion of the bracket housing 334 and configured such that the light radiated by the light source portion 335 is emitted to an outside of the bracket housing. Furthermore, a bezel portion 337 may be further provided between the bracket housing 334 and the lens portion 336 for a lighting image and an appearance image.

As described above, each connecting link configuring the link bracket 330 may be configured to radiate light. The link bracket 330 includes the bracket housing 334, the light source portion 335, and the lens portion 336, in which the bracket housing 334 is formed to communicate to the rear of the vehicle, and the light source portion 335 is provided to radiate the light to the rear of the vehicle inside the bracket housing 334. Furthermore, the open end portion of the bracket housing 334 is mounted with the lens portion 336 and the open end portion is closed. Here, the light source portion 335 may be an LED. Therefore, as the light radiated by the light source portion 335 is emitted to the outside through the lens portion 336 in the link bracket 330, it is easy to recognize the warning message through the link bracket 330 in rainy weather or at night.

As described above, the link bracket 330 is configured such that the light is radiated, and the light source portion 335 may radiate the light in various forms according to an exemplary embodiment of the present invention. As the exemplary embodiment of the present invention, as illustrated in FIG. 8, the light source portion 335 may further include a light guide 335a extending in the longitudinal direction of the bracket housing 334. That is, as the light radiated by the LED is emitted through the light guide 335a, the light source portion 335 is configured in the form in which the light is emitted in the longitudinal direction of the link bracket 330.

As another exemplary embodiment of the present invention, as illustrated in FIG. 9, the light source portion 335 is disposed to be spaced in the longitudinal direction of the bracket housing 334 and thus may be configured such that the light is radiated in a dot type in the longitudinal direction of the link bracket 330. This may be determined depending on the type of light radiation, and changed depending on the number of LEDs configuring the light source portion 335 and whether the light guide 335a is used.

In an exemplary embodiment of the present invention, a second light guide 335b is mounted in front of the light source portion 335 and connected to the bezel portion 337.

Meanwhile, the lens portion 336 may include a transparent lens 336a disposed to face the light source portion 335 and configured such that the light source portion 335 emits the light, and a reflector 336b having the external surface having a red-series color and the internal surface formed to absorb or reflect the light of the light source portion 335 to prevent the light from being emitted to an outside of the bracket housing. Here, the transparent lens 336a and the reflector 336b extend in the longitudinal direction thereof, and as the external surface of the reflector 336b has the red-series color, the reflector 336b may be always identified. Furthermore, as the internal surface of the reflector 336b is configured to absorb or reflect the light, the light radiated by the light source portion is not emitted to the outside in the reflector 336b. To the present end, a plurality of optics may be formed on the internal surface of the reflector 336b, and made of a material having a low light transmittance. Therefore, if the light source portion 335 is operated to radiate the light, as the light is emitted from only the transparent lens 336a, the image according to the form of the link bracket 330 may be smoothly implemented.

Meanwhile, as illustrated in FIG. 10, and FIG. 11, the mounting portion 100 includes a fixing bracket 110 fixed to the trunk lid and having an extending installation portion 111; and a movable bracket 120 having one end portion formed to surround the installation portion 111 and configured to be rotated and tilted laterally from the fixing bracket 110, and the other end portion formed to accommodate the guide portion 200 and provided such that the guide portion 200 is laterally rotatable.

Here, the fixing bracket 110 is fixed to the internal surface of the trunk lid T, and the movable bracket 120 is rotated and tilted laterally from the fixing bracket 110 such that the guide portion 200 and the end portion 300 connected thereto are in place by their own weights. That is, upon the occurrence of the emergency situation of the vehicle, the vehicle may be stopped in a state of being tilted in a roll direction or a yaw direction thereof. At the instant time, when the movable bracket 120 is laterally rotated from the fixing bracket 110, a clearance for the roll direction may be absorbed, and when the movable bracket 120 is laterally tilted thereon, a clearance for the yaw direction may be adjusted.

The fixing bracket 110 may be formed with a plurality of locking slits 112 radially extending around the rotating center point of the movable bracket 120, and the movable bracket 120 may be formed with a plurality of locking projections 121 matched with the locking slits 112 as the locking projections 121 radially extend around the rotating center point of the movable bracket 120.

Therefore, the movable bracket 120 is connected to the fixing bracket 110 through the connection between the locking slit 112 and the locking projection 121. Here, the movable bracket 120 may be laterally rotated from the fixing bracket 110 through the operation by which the locking projection 121 goes over the locking slit 112. Therefore, as illustrated in FIG. 12, the locations of the guide portion 200 and the end portion 300 may be laterally changed to adjust the location of the warning message through the end portion 300 in the roll direction of the vehicle.

Furthermore, the movable bracket 120 may be laterally tilted from the fixing bracket 110 through the operation by which the locking projection 121 is tilted in the extending direction of the locking slit 112. Therefore, as illustrated in FIG. 13, the guide portion 200 and the end portion 300 are laterally tilted, and the location of the warning message through the end portion 300 may be adjusted in the yaw direction of the vehicle.

The aforementioned present invention may be operated as below.

Initially, as illustrated in FIG. 2, the state where the first guide bracket 210 and the second guide bracket 220 are deployed is maintained, and the link bracket 330 also becomes a state of being folded.

Here, when the trunk lid T is opened, the guide portion 200 and the end portion 300 perform the deployment operation by their own weights. That is, as illustrated in FIG. 3, as the first guide bracket 210 and the second guide bracket 220 are retracted, the guide portion 200 and the end portion 300 are deployed to the rear of the vehicle, and the first rotating bracket 321 and the second rotating bracket 322 are rotated at the same angles as the rotating angles of the first guide bracket 210 and the second guide bracket 220. At the instant time, as the distance between the first connecting link 331 and the second connecting link 332 is also close by the distance at which the first guide bracket 210 and the second guide bracket 220 are retracted, the deployment operation is performed while the first connecting link 331, the second connecting link 332, and the third connecting link 333 are unfolded. Furthermore, the first connecting link 331, the second connecting link 332, and the third connecting link 333 maintain the vertical direction by the first joint bracket 311 and the second joint bracket 312.

Accordingly, as illustrated in FIG. 4, the end portion 300 may be moved toward the rear of the vehicle by the deployment operation of the guide portion 200, and the first connecting link 331, the second connecting link 332, and the third connecting link 333 connected via the first rotating bracket 321 and the second rotating bracket 322 may be unfolded, forming the emergency tripod shape to deliver the warning message to the rear of the vehicle.

The warning message delivery apparatus of the vehicle configured as the aforementioned structure deploys the emergency tripod by opening the trunk lid T to deliver the warning message to the vehicle entering the rear upon the occurrence of the emergency situation, and secures the visibility of the emergency tripod to reduce the accident occurrence possibility.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A warning message delivery apparatus of a vehicle, the warning message delivery apparatus comprising:
   a mounting portion configured to be fixed to an internal surface of a trunk lid;
   a guide portion rotatably mounted on the mounting portion, and configured to be rotated by a weight of the guide portion in a state where the trunk lid is opened and deployed to a predetermined direction of the vehicle; and
   an end portion mounted on the guide portion and configured to move to the predetermined direction of the vehicle with the guide portion when the guide portion is deployed, and converted into a shape of delivering a warning message while being deployed downward with the deployment of the guide portion.

2. The warning message delivery apparatus of claim 1, wherein the guide portion is configured to be deployed with an inclination downwardly in a state where the trunk lid is opened.

3. The warning message delivery apparatus of claim 1, wherein the guide portion includes a first guide bracket and a second guide bracket, each of which have first end portions connected the mounting portion to be laterally rotated, and second end portions connected to the end portion, and
   wherein the first guide bracket and the second guide bracket are rotated in directions opposite to each other and the guide portion is deployed while being deployed toward the trunk lid or retracted to the predetermined direction of the vehicle.

4. The warning message delivery apparatus of claim 3, wherein a first gear is formed on the first end portion of the first guide bracket, and a second gear is formed on the first end portion of the second guide bracket, and
   wherein the first gear and the second gear are gear-engaged to each other.

5. The warning message delivery apparatus of claim 3, wherein the end portion includes:
   a joint portion including a first joint bracket rotatably connected to the second end portion of the first guide bracket, and a second joint bracket rotatably connected to the second end portion of the second guide bracket;
   a rotation portion including a first rotating bracket rotatably connected to the first joint bracket, and a second rotating bracket rotatably connected to the second joint bracket; and
   a plurality of link brackets rotatably connected to the first rotating bracket and the second rotating bracket.

6. The warning message delivery apparatus of claim 5, wherein the first joint bracket is vertically rotatable to the first guide bracket, and the second joint bracket is vertically rotatable to the second guide bracket,
   wherein the first rotating bracket is laterally rotatable to the first joint bracket and the second rotating bracket is laterally rotatable to the second joint bracket, and
   wherein the plurality of link brackets is converted into a shape of delivering the warning message when the guide portion is completely deployed.

7. The warning message delivery apparatus of claim 5, wherein the plurality of link brackets includes a first connecting link having a first end portion connected to the first rotating bracket to be laterally rotatable, a second connecting link having a first end portion connected to the second rotating bracket to be laterally rotatable, and a third connecting link connected to a second end portion of the first connecting link and a second end portion of the second connecting link to be laterally rotatable.

8. The warning message delivery apparatus of claim 7, wherein the third connecting link has a first end portion connected to the second end portion of the second connecting link and a second end portion connected to the second end portion of the first connecting link in a state where the first connecting link and the second connecting link are crossed so that the first connecting link, the second connecting link, and the third connecting link form a triangular shape when the guide portion is deployed.

9. The warning message delivery apparatus of claim 5, wherein each of a matching surface of the first joint bracket and the first rotating bracket and a matching surface of the second joint bracket and the second rotating bracket is consistent with an extending direction of the guide portion.

10. The warning message delivery apparatus of claim 5, wherein the plurality of link brackets includes:
    a bracket housing formed to communicate to the predetermined direction of the vehicle;
    a light source portion provided inside the bracket housing to radiate light to the predetermined direction of the vehicle; and
    a lens portion mounted on a communicating end portion of the bracket housing and configured so that the light radiated by the light source portion is emitted to an outside of the bracket housing through the lens portion.

11. The warning message delivery apparatus of claim 10, wherein the light source portion is disposed to be spaced in a longitudinal direction of the bracket housing.

12. The warning message delivery apparatus of claim 10, wherein a light guide extending in a longitudinal direction of the bracket housing is provided in the bracket housing to guide the light of the light source portion to the lens portion.

13. The warning message delivery apparatus of claim 10, wherein the lens portion includes a transparent lens disposed to face the light source portion and configured so that the light source portion emits the light, and a reflector having an external surface having a red-series color and having an internal surface formed to absorb or reflect the light of the light source portion to prevent the light from being emitted to the outside of the bracket housing.

14. The warning message delivery apparatus of claim 10, further including:
    a bezel portion provided between the bracket housing and the lens portion for a lighting image and an appearance image,
    wherein a first light guide extending in a longitudinal direction of the bracket housing is provided onto the bezel portion in the bracket housing to guide the light of the light source portion between the reflector and the bezel portion.

15. The warning message delivery apparatus of claim 14, further including a second light guide into which the light source portion is placed, wherein the second light guide is connected to an end of the bezel portion.

16. The warning message delivery apparatus of claim 1, wherein the mounting portion includes:
   a fixing bracket configured to be fixed to the trunk lid and having an extending installation portion; and
   a movable bracket having a first end portion formed to surround the installation portion and provided on the fixing bracket to be rotated and tilted laterally, and a second end portion formed to accommodate the guide portion and provided so that the guide portion is laterally rotatable on the movable bracket.

17. The warning message delivery apparatus of claim 16, wherein the fixing bracket is formed with a plurality of locking slits radially extending around a rotating center point of the movable bracket, and
   wherein the movable bracket is formed with a plurality of locking projections matched with the plurality of locking slits as the plurality of locking projections radially extend around the rotating center point.

\* \* \* \* \*